Sept. 7, 1948.  C. F. GLICK  2,448,525
PHOTOGRAPHIC ELEMENTS BEARING A POLYVINYLPYRIDINE SUBLAYER, A LAYER
CONTAINING A SOLUBLE BORON COMPOUND AND A SILVER HALIDE SYNTHETIC
HYDROXYL POLYMER LAYER AND THEIR PREPARATION
Filed Nov. 27, 1946

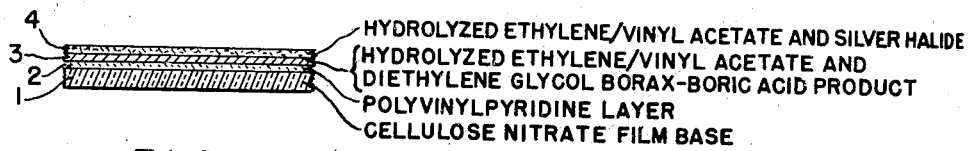

- HYDROLYZED ETHYLENE/VINYL ACETATE AND SILVER HALIDE
- {HYDROLYZED ETHYLENE/VINYL ACETATE AND
- DIETHYLENE GLYCOL BORAX-BORIC ACID PRODUCT
- POLYVINYLPYRIDINE LAYER
- CELLULOSE NITRATE FILM BASE

FIG.1.

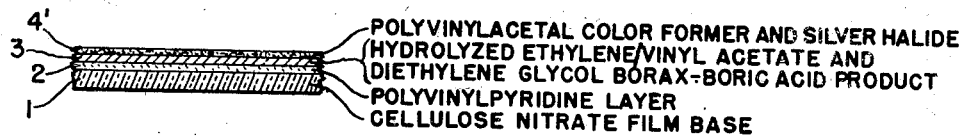

- POLYVINYLACETAL COLOR FORMER AND SILVER HALIDE
- {HYDROLYZED ETHYLENE/VINYL ACETATE AND
- DIETHYLENE GLYCOL BORAX-BORIC ACID PRODUCT
- POLYVINYLPYRIDINE LAYER
- CELLULOSE NITRATE FILM BASE

FIG.2.

*INVENTOR.*
CHARLES F. GLICK
BY
*Lynn Barratt Morris*
ATTORNEY

Patented Sept. 7, 1948

2,448,525

UNITED STATES PATENT OFFICE 2,448,525

PHOTOGRAPHIC ELEMENTS BEARING A POLYVINYLPYRIDINE SUBLAYER, A LAYER CONTAINING A SOLUBLE BORON COMPOUND AND A SILVER HALIDE SYNTHETIC HYDROXYL POLYMER LAYER AND THEIR PREPARATION

Charles F. Glick, New Brunswick, N. J., assignor to E. I. du Pont de Nemours & Company, Wilmington, Del., a corporation of Delaware Application November 27, 1946, Serial No. 712,733

9 Claims. (Cl. 95—9)

This invention pertains to photographic elements and to their preparation. More particularly, it pertains to photographic elements bearing synthetic hydroxyl polymer layers and to their preparation.

The coating of synthetic hydroxyl polymer layers, and especially silver halide emulsion layers, is difficult to carry out on a commercial scale. It is also quite difficult to obtain a satisfactory degree of permanent adherence of such layers to the support. Synthetic hydroxyl polymers, e. g., polyvinyl alcohol and derivatives and interpolymers thereof, do not gel or set like gelatin with slight lowering of temperature. When elevated temperatures are used to drive off the solvent, hydroxyl polymers can be coated fairly rapidly but the layers tend to be tricky. It has been proposed to add various types of gelling agents to polyvinyl alcohol compositions to improve their coating properties. They are generally added during the preparation of the emulsion. This practice, while useful for small operations, has some disadvantages for large-scale commercial operations. The emulsions sometimes gel or set up in the containers or coating apparatus. The layers lack uniformity because the gelling agents continue to act.

An object of this invention is to improve the art of coating synthetic hydroxyl polymers. A more specific object is to improve the art of coating synthetic hydroxyl polymer silver halide emulsions. A further object is to improve the anchorage of such polymer layers to supports. A related object is to provide photographic supports with gelled layers composed of synthetic hydroxyl polymers which are permanently anchored thereto. Another object is to provide processes for preparing such elements which can be carried out as a continuous commercial operation. Still other objects will be apparent from the more detailed description of the invention.

The above objects are attained by the preparation of photographic elements comprising a support having deposited thereon a sublayer composed of a vinyl-pyridine polymer on which is coated an intermediate layer composed of a synthetic hydroxyl polymer colloid which carries a gelled light-sensitive, synthetic, hydroxyl polymer colloid silver halide emulsion layer.

The novel elements are advantageously prepared by dissolving a vinylpyridine polymer in a solvent, e. g., water-miscible alcohol or acetone or mixtures thereof, in an amount of 0.25 to 20% by weight of the alcohol. A 2 to 5% solution in acetone-ethanol containing 40 to 60 parts of the former per 60 to 40 parts of the latter by weight being quite practical. The resulting solution is then deposited on a support, for example, a film base or sheet of paper and dried. An aqueous solution of a water-soluble or hydrophilic synthetic hydroxyl polymer is prepared and material amounts of a soluble boron compound which form borate ions in aqueous solution admixed therewith are deposited on the vinylpyridine polymer layer. An aqueous solution of a synthetic hydroxyl polymer colloid which has light-sensitive silver halides dispersed therethrough is deposited on the intermediate layer. The pH of the layers is adjusted so that the light-sensitive layer is alkaline. Thus, if the pH of the intermediate layer is on the alkaline side, a neutral alkaline or slightly acidic colloid silver halide emulsion is deposited thereon. The layer can be made alkaline after coating by impregnating it with an aqueous alkaline solution, e. g., a sodium carbonate solution. The soluble boron compound diffuses and causes gelling of the emulsion layer. In case an acidic emulsion layer is coated, the boron compound should be sufficiently alkaline to result in a final pH of at least 7.0 and preferably of at least 7.5.

In the preferred form of the invention a support is first coated with a vinylpyridine polymer sublayer. An aqueous solution of a synthetic hydroxyl polymer containing a soluble boron compound and having a pH of not more than 6 is coated on the sublayer to form a gelling intermediate layer. An aqueous solution of an alkaline hydroxyl polymer silver halide emulsion having a pH of more than 7.5 is coated onto the intermediate layer. The layer gels rapidly as the coating is applied and takes effect from the bottom up. In general, adequate gelation occurs in less than 60 to 90 seconds.

The vinylpyridine polymers can be made by polymerizing a monomeric vinylpyridine, e. g., alpha-, beta-, or gamma-vinylpyridine or a homologue thereof containing an alkyl radical of one to four carbon atoms in the pyridine ring, in a liquid medium by the aid of a polymerization catalyst. An organic solvent solution can be used if desired in which case inert organic solvents are used. However, emulsion polymerization is quite useful and bulk polymerization methods are effective. The polymerization is preferably carried out in an aqueous mineral acid solution or medium in the presence of a peroxy compound catalyst at temperatures from about 20° to 50° C. for a period of ten or less to 200 or more hours. The proportion of mineral acid, e. g., hydrochloric or sulfuric, may vary over a fairly wide range, e. g., from 0.5 to 2.5 mols of acid per mol of vinylpyridine monomer. The resulting solution may be diluted with water and the solution added to a basic solution, e. g., aqueous sodium hydroxide, and the precipitated resin filtered, washed, and dried. A neutralizing agent can be present in the wash water.

The invention is not limited to the use of polyvinylpyridine, including the alkyl substituted polyvinylpyridines, as the binding agents for the antihalation materials because copolymers soluble in 1% aqueous acetic acid which contain up to 20% of another polymerizable vinyl or vinylidene compound having a single vinyl group (CH$_2$=C<) are useful. Suitable compounds for copolymerization with a monomeric vinylpyridine are styrene, acrylic esters and amides, alpha-alkyl-substituted acrylic esters and amides, acrylonitriles, and methacrylonitriles.

In making the copolymers there may be used such materials as methyl or ethyl acrylates; methyl, ethyl isobutyl, and methoxyethyl methacrylates; methacrylamide and N-methylacrylamide; acrylonitrile and methacrylonitrile; styrene, vinyl naphthalene, and the like or mixtures of two or more of these compounds.

In a preferred aspect of the invention the polymers of unsubstituted alpha or 2-vinylpyridine or its interpolymers containing 1 to 10% of a different interpolymerizable monomer are used. Such polymers are non-water-soluble synthetic resins soluble in alcohols, e. g., methyl, ethyl, propyl, and butyl, and mixtures of such alcohols with ketones, e. g., acetone, methyl ethyl ketone, methyl propyl ketone, and methyl isobutyl ketone or in certain chlorinated hydrocarbons, e. g., trichlorethylene. They form clear, light-colored, non-tacky films or coatings which are readily and completely soluble in dilute aqueous acids, e. g., acetic, hydrochloric, sulfamic, sulfuric, phosphoric, and oxalic acids.

Synthetic hydroxyl polymers of the type comprehended by the invention are hard-film forming polymers which contain a plurality of recurring aliphatic hydroxyl groups as the predominant hydrophilic group. The preferred synthetic hydroxyl polymers contain a plurality of recurring vinyl alcohol units

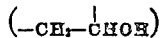

Polyvinyl alcohol and its lower fatty acid esters and lower alkyl ethers and acetals are especially useful polymers of this type. Polyvinyl alcohol is a tough, water-white, resin-like material. It is soluble in water. The more highly polymerized varieties are soluble in hot water and the medium or lower polymers are soluble in cold water. They are usually prepared by hydrolysis of polyvinyl esters, such as polyvinyl acetate, polyvinyl chloracetate, polyvinyl isobutyrate, etc. The partly hydrolyzed esters which contain a large number of recurring vinyl alcohol units

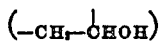

are water-soluble in character. The ethers can be made by incompletely etherifying the completely or partially hydrolyzed polyvinyl acetate, etc. The polyvinyl acetals, e. g., polyvinyl acetaldehyde acetal and polyvinyl isobutyral, can be made by acetalization of polyvinyl and its incompletely hydrolyzed carboxylic acid esters.

In addition to the water-soluble synthetic hydroxyl polymers just described, there may be mentioned partially and completely hydrolyzed polyvinyl ester, e. g., polyvinyl acetate interpolymers with ethylenically unsaturated compounds, such as vinyl chloride and styrene; acrylic acid esters, e. g., methyl acrylate; methacrylic acid esters, e. g., methyl methacrylate; and mono-olefines, e. g., ethylene. The completely hydrolyzed ethylene/vinyl acetate interpolymer emulsion described in McQueen 2,397,866 and Roland 2,386,347 form an important class of silver halide emulsions which can advantageously be coated by the improved methods in question. These polymers may contain color-former nuclei. Suitable polymers of this type are described in United States Patents 2,310,943, 2,397,864, 2,397,865 and 2,320,422 and in United States application Serial Number 528,946 now Patent No. 2,415,381.

The synthetic hydroxyl polymers set forth above are characterized by the presence of a large number of free aliphatic hydroxyl groups which are present in recurring vinyl alcohol

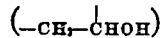

units.

While boric acid and borax containing sublayers having a pH less than 6 are useful for gelling the coated vinyl alcohol polymer silver halide emulsion layers, it has been found that the boric acid esters of polyhydric alcohols are eminently well suited for this purpose and cause a rapid gelling of the silver halide emulsion layers. Such esters can be prepared by reacting a polyhydric alcohol, e. g., ethylene glycol, diethylene glycol, triethylene glycol, erythrol, sorbitol, and mannitol with boric acid or a mixture of boric acid and borax, by heating the admixture to 100° to 160° C. A copious evolution of water occurs. The resulting products are viscous syrups or resins of a colloidal nature and have a high molecular weight and complex structure. They are readily soluble in water but are substantially insoluble in hydrocarbons but probably hydrolyze to the boric acid and glycol in water. Their preparation is described in various United States Patents including 1,953,741, 2,223,349, 2,223,948, 2,223,949, and 2,224,011. These compounds have been referred to as boriborates.

In order to reduce the pH of the sublayer to the desired level, there may be added to the sublayer a small amount of a readily soluble acid, e. g., glycolic acid, acetic acid, diglycolic acid, etc., or acid reacting salts, e. g., ammonium nitrate and ammonium chloride.

The soluble boron compounds are used in amounts sufficient to give complete gelling of the overcoated synthetic hydroxyl polymer-silver halide emulsion layer. The amounts, of course, vary in accordance with the particular hydroxyl polymer emulsion to be gelled. In general, amounts from 20 to 60% by weight of the polymer in the sublayer are sufficient to gel the silver halide emulsion coatings.

The invention will be further illustrated but is not intended to be limited by the following examples. The parts are by weight.

*Example I*

A cellulose nitrate film base 1 as shown in Fig. 1 of the accompanying drawing is coated with a solution consisting of three parts of polyvinylpyridine, 40 parts of acetone, and 57 parts of ethanol to form a thin sublayer 2. Fifty cubic centimeters (50 cc.) of a solution of ten parts of a hydrolyzed ethylene/vinyl acetate interpolymer of the type described in Example I of McQueen United States Patent 2,397,866 in ten parts of ethanol and 80 parts of water are mixed with 1.65 grams of glycolic acid and 115 cc. of aqueous solution containing 2.5 parts of diethylene glycol-borax-boric acid condensation product prepared as described in United States Patent 1,953,741 by heating the admixture to 100° to 160° C. The resulting solution is coated onto the sublayer to form an intermediate gelling layer 3. A flowable photographic silver halide emulsion in the same interpolymer is made as described in Example I of the aforesaid McQueen patent in an amount of 100 cc. and mixed with 15 cc. of water and 3 cc. of 6NKOH and coated onto the dried intermediate layer to form emulsion coating 4. The emulsion begins to gel as the coating is applied and proceeds from the bottom upward. A firm gelled emulsion is formed in about two minutes. The sublayers are clear and non-tacky. Good wet and dry anchorage exists betwen the film base and the coated layers.

The diethylene glycol boriborate is made by reacting diethylene glycol with a mixture of boric acid and borax by heating the admixture to 100° to 160° C., whereby a copious evolution of water occurs, as described in United States Patent 1,953,741.

Example II

A cellulose nitrate film base is provided with a polyvinylpyridine sublayer as described in Example I. To 115 cc. of 2.5% aqueous solution of diethylene glycol-borax-boric acid condensation product, described in Example I, are added 1.22 grams of diglycolic acid, 50 cc. of ten parts of the interpolymer of Example I in ten parts of ethanol and 80 parts of water and 0.5 cc. of a 10% aqueous solution of N-cetylbetaine. The resulting solution is coated onto the aforesaid sublayer and dried to form an intermediate layer. A solution of a photographic emulsion is prepared and coated as described in Example I with similar results.

Example III

A cellulose nitrate film base is provided with a polyvinylpyridine sublayer as described in Example I. An intermediate gelling layer is coated on the sublayer from a coating solution made by mixing 75 cc. of ethanol, 2.9 cc. of diethylene glycol-borax-boric acid condensation product of Example I, 37 cc. of water, 0.83 gram of glycolic acid, and adding the mixture to 50 cc. of ten parts of the interpolymer of Example I, ten parts of ethanol, 80 parts of water, and 0.5 cc. of a 10% aqueous solution of N-cetylbetaine.

A silver halide emulsion in a hydrolyzed ethylene/vinyl acetate interpolymer is prepared as described in Example I and 150 cc. of it is mixed with 15 cc. of a 6.7% aqueous solution of triethanolamine and 0.75 cc. of a 10% aqueous solution of N-cetylbetaine. The flowable emulsion is coated onto the intermediate layer. The coating gels rapidly as the emulsion is applied. A firm gelled layer forms in about 30 seconds. The sublayer and intermediate layer are clear and non-tacky. Good wet and dry anchorage between all layers is noted in the raw and photographically processed stock.

Example IV

A cellulose nitrate film base 1 as shown in Fig. 2 of the accompanying drawing is provided with a polyvinylpyridine sublayer 2 and an intermediate gelling layer 3 as described in Example III. Silver halides are dispersed in a hydrophilic polyvinyl acetal of m[p-(5-ethylcarbonato-3-methyl-1-pyrazolyl)benzamido]benzaldehyde was prepared as described in Martin Serial Number 682,137, filed July 8, 1946, after the manner described in Jennings et al. United States Patent 2,397,864. One hundred cubic centimeters (100 cc.) of this emulsion was mixed with 6.7 cc. of triethanolamine solution containing one part of the former in nine parts of water. The resulting color-forming light-sensitive silver halide dispersion is coated onto the gelling intermediate layer. The polyvinylacetal color former layer 4' gels from the bottom upward as it is applied and a firm gel layer forms in about 30 seconds. The resulting element has good wet and dry anchorage of all layers.

Similar results are obtainable by substituting other hydrophilic color former polymers including the hydrophilic mixed acetal of m-(benzoyl-acetamido)benzaldehyde and o-sulfobenzaldehyde (Na salt) with polyvinyl alcohol described in McQueen Serial Number 667,126, filed May 3, 1946.

In place of the specific gelling agents described above, there may be substituted other boric acid esters or salts capable of yielding borate ions in aqueous solution. Suitable additional compounds include sodium and potassium tetraborate, metaborate, and orthoborate, boric acid, glyceryl borate, glycerol boriborate; the sorbitol, mannitol, and dulcitol monoborate and diborates and mono- and poly-condensation products and their sodium and ammonium salts set forth in Examples 1 to 19 of United States Patent 2,223,349 and Examples 3, 4, 5, 7, 9, 14, and 18 to 35 of United States Patent 2,223,948. The pH of these products runs from about 2.0 to 10.4. Still other useful boric acid esters are those of 1,2,3,4,5-pentahydroxyhexane, persitol, valemitol, octahydroxyoctanes, nonahydroxynonanes, conylene glycol, xylylene glycol, inositol, cyclohexane-diol, etc. Mixtures of two or more of such esters and/or salts or boric acid can be used.

The invention is not limited to cellulose derivative film supports but may be used with any type of support. It is especially useful with hydrophobic supports. The polyvinylpyridine layers have been found to be adherent to various other materials, e. g., cellulose acetate, cellulose propionate, cellulose acetatebutyrate, polyamides, polyvinyl acetals, cellulose ethers, vinylchloride and copolymers, vinylfluoride and copolymers, and polyvinyl alcohol, paper, baryta coated paper, transparentized paper, metals, e. g., ferrous metal plates, aluminum sheets, glass, etc.

An advantage of the invention resides in the fact that it provides photographic elements with strongly adherent synthetic hydroxyl polymer layers. It provides a rapid and commercially practical method of gelling such layers.

Another advantage of the invention is that it provides a simple method for gelling polymeric hydroxyalkane silver halide emulsion layers. A further advantage is that the gelling of such layers can be efficiently controlled. A still further advantage is that it simplifies coating operations in that the emulsions do not substantially vary in viscosity during coating operations. Since the gelling agents are not added to the coating solutions of the silver halide emulsions, there is no danger of having them set up or gel prior to coating. A further advantage resides in the fact that no color is imparted from the novel gelling agents. The gelling takes effect from the bottom of the coated layer upwardly giving a uniform product.

The action is very rapid and gelling takes place as the coating solution is applied to the layer containing the gelling agent.

As many apparently widely different embodiments of this invention may be made without departing from the spirit and scope thereof, it is to be understood that the invention is not to be limited except as defined by the appended claims.

What is claimed is:

1. A photographic element comprising a support, a water-insoluble film-forming vinylpyridine polymer sublayer on said support, a synthetic hydroxyl polymer intermediate layer on said support containing a soluble boron compound capable of yielding borate ions on said sublayer and a gelled synthetic hydroxyl polymer silver halide emulsion layer on said intermediate layer said hydroxyl polymer containing a plurality of recurring intralinear $-CH_2-CHOH-$ groups and said vinylpyridine polymer being soluble in 1% aqueous acetic acid.

2. A photographic element comprising a transparent support, a sublayer on said support composed of water-insoluble film-forming vinylpyridine polymer which is soluble in 1% aqueous acetic acid, an intermediate layer composed of a synthetic hydroxyl polymer containing a soluble boron compound capable of yielding borate ions on said sublayer and a gelled synthetic hydroxyl polymer silver halide emulsion layer on the intermediate layer, said hydroxyl polymer containing a plurality of recurring intralinear $-CH_2-CHOH-$ groups.

3. A photographic element comprising a transparent, flexible, hydrophobic film support, a sublayer on said support composed of water-insoluble film-forming vinylpyridine polymer which is soluble in 1% aqueous acetic acid, an intermediate layer composed of a synthetic hydroxyl polymer containing a soluble boron compound capable of yielding borate ions on said sublayer and a gelled synthetic hydroxyl polymer silver halide emulsion layer on the intermediate layer, said hydroxyl polymer containing a plurality of recurring intralinear $-CH_2-CHOH-$ groups.

4. A photographic element comprising a support, a water-insoluble film-forming vinylpyridine polymer sublayer on said support, a hydrophilic hydrolyzed ethylene/vinyl acetate interpolymer intermediate layer on said support containing a soluble boron compound capable of yielding borate ions on said sublayer and a gelled hydrophilic hydrolyzed ethylene/vinyl acetate interpolymer silver halide emulsion layer on said intermediate layer said vinylpyridine polymer being soluble in 1% aqueous acetic acid.

5. A photographic element comprising a paper support, a water-insoluble film-forming vinylpyridine polymer sublayer on said support, a hydrophilic hydrolyzed ethylene/vinyl acetate interpolymer intermediate layer on said support containing a soluble boron compound capable of yielding borate ions on said sublayer and a gelled hydrophilic hydrolyzed ethylene/vinyl acetate interpolymer silver halide emulsion layer on said intermediate layer said vinylpyridine polymer being soluble in 1% aqueous acetic acid.

6. A photographic element comprising a support, a sublayer on said support composed of water-insoluble polyvinylpyridine which is soluble in 1% aqueous acetic acid, an intermediate layer composed of a synthetic hydroxyl polymer containing a soluble boron compound capable of yielding borate ions on said sublayer and a gelled synthetic hydroxyl polymer silver halide emulsion layer on the intermediate layer, said hydroxyl polymer containing a plurality of recurring intralinear $-CH_2-CHOH-$ groups.

7. An element as set forth in claim 6 wherein the boron compound is a boric acid ester of a polyhydric alcohol.

8. The process of manufacturing photographic elements which comprises coating a support with a sublayer composed of a water-insoluble film-forming vinylpyridine polymer which is soluble in 1% aqueous acetic acid, coating said sublayer with an aqueous solution containing a synthetic hydroxyl polymer and a soluble boron compound capable of yielding borate ions, coating the intermediate layer formed with a synthetic hydroxyl polymer silver halide emulsion and adjusting the pH of the coated layers to more than 7.5 said hydroxyl polymer containing a plurality of recurring intralinear $-CH_2-CHOH$ groups.

9. The process of manufacturing protographic elements which comprises coating a support with a sublayer composed of a water-insoluble filmforming vinylpyridine polymer which is soluble in 1% aqueous acetic acid, coating said sublayer with an aqueous solution containing a synthetic hydroxyl polymer and a soluble boron compound capable of yielding borate ions, and having a pH of not more than 6 and coating the intermediate layer with an alkaline synthetic hydroxyl polymer silver halide emulsion having a pH greater than 7.5 said hydroxyl polymer containing a plurality of recurring intralinear $-CH_2-CHOH$ groups.

CHARLES F. GLICK.

REFERENCES CITED

The following references are of record in the file of this patent:

UNITED STATES PATENTS

| Number | Name | Date |
| --- | --- | --- |
| 2,119,724 | Staud | June 7, 1938 |
| 2,397,865 | Jennings | Apr. 2, 1946 |